United States Patent [19]

Turbak et al.

[11] 4,056,675

[45] Nov. 1, 1977

[54] PROCESS FOR PRODUCING REGENERATED CELLULOSIC FIBERS

[75] Inventors: Albin Frank Turbak, Convent Station; Richard Benjamin Hammer, Morris Plains, both of N.J.

[73] Assignee: International Telephone and Telegraph Corporation, New York, N.Y.

[21] Appl. No.: 662,132

[22] Filed: Feb. 27, 1976

[51] Int. Cl.² ............................................. C08B 16/00
[52] U.S. Cl. .......................................... 536/57; 536/35
[58] Field of Search .................. 536/30, 32, 35, 57; 264/183, 187, 188

[56] References Cited

U.S. PATENT DOCUMENTS

| | | | |
|---|---|---|---|
| 2,472,591 | 6/1949 | Kenyon et al. | 536/35 |
| 3,236,669 | 2/1966 | Williams | 536/57 |
| 3,702,843 | 11/1972 | Schweiger | 536/35 |

FOREIGN PATENT DOCUMENTS

| | | | |
|---|---|---|---|
| 786,225 | 5/1968 | Canada | 536/30 |
| 876,148 | 7/1971 | Canada | 536/30 |
| 899,559 | 5/1972 | Canada | 536/30 |

OTHER PUBLICATIONS

Venkateswaran et al., Journal of Applied Polymer-Science, vol. 18, 1974, pp. 133-142.

*Primary Examiner*—Ronald W. Griffin
*Attorney, Agent, or Firm*—J. B. Raden; H. J. Holt

[57] ABSTRACT

Regenerated cellulosic fibers of improved resistance to alkaline treatment are produced by nitrosating and dissolving from 5 to 14% by weight of a cellulosic material in a dialkylacylamide solvent while said solution is maintained at a temperature no greater than 20° C to form a cellulose nitrite ester, and regenerating the cellulose by contacting the cellulose ester with a regenerant. Regeneration of the cellulose occurs before significant oxidation of the cellulose takes place.

6 Claims, No Drawings

PROCESS FOR PRODUCING REGENERATED CELLULOSIC FIBERS

This invention relates to a process for producing regenerated cellulosic fibers.

The use of organic solvent systems for dissolving cellulose and producing regenerated cellulosic products is receiving an increasing amount of attention because of the cost and environmental problems associated with conventional viscose processes. One such organic solvent system having considerable promise consists of a dimethylformamide solvent and dinitrogen tetroxide as a nitriting or nitrosating agent. In such a system, the cellulose is regenerated from the organic solvent by contact with a nonsolvent for the cellulose which may be water or a lower alcohol. Such a system is shown, for example, in Canadian Pat. No. 899,559. The dissolution of cellulose in dimethylformamide and dinitrogen tetroxide is also disclosed in Canadian Pat. No. 876,148 and in U.S. Pat. Nos. 3,669,916 and 3,702,843. However, fibers spun in accordance with the processes disclosed in such prior art possess unacceptable commercial properties and in particular are deficient in their resistance to alkaline treatment.

It is accordingly a primary object of the present invention to provide a process for improving the alkaline resistance of regenerated cellulosic articles produced by organic solvent systems.

It is an additional object of this invention to provide an organic solvent process for producing cellulosic fibers having properties significantly improved as compared to the best properties previously obtainable by the use of such a process.

It is believed that the generally high and wide range of alkaline solubility values obtained with regenerated cellulosic articles produced in accordance with prior art organic solvent techniques is due to oxidation of the cellulose by the nitrosating agent, which in turn is a function of the temperature of nitrosation and dissolution of the cellulose. In any event, regardless of theoretical considerations, it has been found that the resistance of regenerated cellulosic fibers to alkaline solubility may be considerably enhanced by controlling the temperature of nitrosation and dissolution at a level below room temperature and then regenerating before significant oxidation of the cellulose takes place. More specifically, the process of the invention comprises nitrosating and dissolving from 5 to 14% by weight of a cellulosic material in a dialkylacylamide solvent to form a solution of a cellulose nitrite ester while said solution is maintained at a temperature no greater than 20° C and preferably below 10° C, and then regenerating the cellulose by contacting the solution with a regenerant before significant oxidation of the cellulose takes place. Significant oxidation of the cellulose is prevented if regeneration is carried out promptly after completion of dissolution, or alternatively, if regeneration occurs within 60 hours after completion of dissolution if the solution is cooled well below ambient temperatures. Completion of dissolution occurs when the solution is microscopically free of cellulosic particles or fibers at 50X magnification. As a general guide, time from complete dissolution to regeneration may range from up to two hours at ambient solution temperatures (20° C) to as long as 60 hours at temperatures of less than 0° C. The storage temperature of the solution should never be greater than 20° C.

Regenerated cellulosic fibers produced in accordance with the invention are fully comparable in properties to regular rayon fibers produced by the viscose process. They possess an "$S_{6.5}$" solubility considerably lower than equivalent fibers produced by organic solvent processes not utilizing the time-temperature controls herein described. $S_{6.5}$ solubility is a measure of a regenerated cellulosic fiber's solubility in 6.5% NaOH at 20° C. It is a useful test for determining the potential resistance of such fibers and resultant fabrics to alkaline treatment such as alkaline laundering or mercerization.

In the practice of the invention, the cellulosic material is normally first added to the dialkylacylamide solvent and then nitrogen dioxide or its dimer, dinitrogen tetroxide, is then fed into the mixture while cooling and stirring. Analytical studies have indicated that this process of dissolution involves a reaction of nitrogen dioxide with cellulose to form a solvent soluble cellulose nitrite ester and nitric acid.

The dialkylacylamide solvent is preferably N,N-dimethylformamide (DMF). Other useful dialkylacylamides are N,N-dimethyl-and N,N-diethylacetamide. The solvent should be capable of dissolving the nitrited cellulose without substantial depolymerization of the cellulose. The amount of solvent is not critical although it will normally vary from about 60 to 90% of the total weight of the solution.

A wide variety of cellulosic sources may be used such as chemical pulps, either sulfite or kraft, bleached or unbleached. Cotton linters, reprocessed cellulose and purified bast fibers are other typical sources of cellulose. About 5–14 grams of cellulose per 100 grams of solution should typically be used, preferably from 6–12 grams, and even more preferably from 8–10 grams, per 100 grams of solution. The concentrations will vary with the degree of polymerization (DP) of the cellulose, lower concentrations being used for higher DP's. The cellulosic pulps will normally vary from 250–1000 DP, a range of 300–800 being preferred.

The nitrosating agent is fed into the mixture of solvent and cellulose, normally in stoichiometric excess, as the mixture is cooled and stirred. The nitrosyl group is preferably added as $NO_2$, or its dimer $N_2O_4$, but may also be in the form of other oxides such as $N_2O_3$ or $N_2O_5$ or other nitrosating species such as nitrosyl chloride. Slightly greater than 3 moles of the nitrosating agent should be added per mole of anhydroglucose unit in the cellulose. In order to obtain improved caustic resistance properties, the nitrosating agent should be added while the mixture of cellulose and DMF or other solvent is maintained at a temperature no greater than 20° C, preferably below 10° C, and even more preferably below 0° C. It should be noted that the nitrosation reaction is exothermic and in the absence of cooling, the solution will rise to a temperature of about 40° C to 45° C within about 30 to 45 minutes as the nitrosating agent is added. Dissolution time of the nitrite ester in the solvent is a function of the DP of the cellulose, the temperature of the mixture and the type of equipment used. The time will normally range from as little as one or two hours to 16 hours or even longer. The temperature during dissolution should also not rise above 20° C. Faster dissolution times will be obtained by permitting the temperature to rise to as high as 20° C after $N_2O_4$ addition and by using cellulosic material of lower DP's. Lower dissolution temperatures and higher DP's will conversely require longer dissolution time.

After dissolution is complete, the solution should be deaerated and spun as soon as possible. If the solution is stored at ambient temperatures of about 20° C, regeneration should occur within about 2 hours after completion of dissolution to avoid oxidation of the cellulose and to improve the resistance of the fiber to alkaline solubility. If the solution is however cooled to temperatures below 0° C, regeneration or spinning may occur as long as 60 hours after dissolution. Other temperature-time combinations may easily be extrapolated from these limits. At a temperature of e.g., 10° C, storage time may extend to about 30 hours. In general commercial practice, spinning will normally occur well within the two hour limit at room temperatures.

A wide variety of reagents may be used for coagulation and ultimate regeneration of the cellulose. Where more than a single coagulant or regenerant bath is used, the baths may consist of the same or different coagulants. A particularly useful class of coagulants, which also act as regenerants, are 1-9 carbon aliphatic alcohols, and particularly 1-3 carbon aliphatic alcohols including methanol, ethanol and isopropanol. Other useful alcohols are aromatic alcohols such as benzyl alcohol and cycloaliphatic alcohols such as cyclohexanol. Water, aqueous solutions of the foregoing alcohols and aqueous and alcoholic solutions of the dialkylacylamides are also useful. The aforementioned materials act as both coagulants and regenerants. For purposes of coagulation, any liquid may be used which is compatible with, and causes extraction of the solvent from the cellulose. The regenerant must contain a chemical moiety such as a hydroxylic or protonic group which is capable of removing an -NO group from the cellulose. In most instances a single material will function for both purposes.

There may also be added to the coagulant a base which is soluble in the coagulant and reactive with the nitric acid introduced into the coagulant during the process. The addition of a base further enhances the alkaline resistance of the fiber. Examples of useful bases which are soluble in alcohol and which react therein with nitric acid are the alkali and alkaline earth metal hydroxides such as sodium, magnesium and potassium hydroxide and alkoxides of the alcohol regenerants such as sodium and magnesium methoxide and ethoxide. The addition of a base to the coagulant is more fully disclosed in copending application Ser. No. 662,137 filed of even date herewith.

The solution will normally be spun into a primary coagulant bath, the coagulated fiber passed to a primary godet, then through a secondary bath to a secondary godet, whose speed can be altered to produce the desired degree of stretch. Additional godets and/or coagulant baths may be used to introduce further stretch and complete the regeneration.

The following examples are illustrative of the practice of the invention. Unless otherwise indicated, all parts are by weight.

EXAMPLE 1

A prehydrolyzed kraft pulp having a DP of 1050 was alkaline aged to a DP level of 450, neutralized, washed, dried, then fluffed and defibered by means of a rotary cutter. A solution containing a ratio of 8 parts of cellulose, 15 parts of $N_2O_4$ and 77 parts of DMF was prepared by charging 160 parts of the alkali aged prehydrolyzed kraft pulp (DP 450) and 1540 parts of dimethylformamide (DMF) into a two-liter four neck resin reaction flask equipped with a stainless-steel mechanical stirrer, thermometer, and a 250 ml equalizing pressure addition funnel. The resulting slurry was stirred and cooled to $-3°$ to $+2°$ C, while 300 parts of liquid nitrogen tetroxide ($N_2O_4$) was added dropwise over about a 60 minute time period. The temperature of the resulting exothermic reaction was maintained at $-3°$ to $+2°$ C during $N_2O_4$ addition and then was maintained at $-5°$ C during the remaining dissolution process. Total dissolution time was 16 hours including the time for $N_2O_4$ addition. The solution was immediately deaerated at ambient temperatures and vertically spun using a glass 300 hole (0.0025 inch) spinnerette. The fiber tow was passed through a primary bath of isopropanol at 20° C and the resulting fibers passed vertically to a primary godet and then thru a secondary bath to a secondary godet. The secondary bath was water at 13° C. The fibers were treated with 90° C 6% $NaHCO_3$, 50° C water, 50° C 0.3% finish, centrifuged and oven dried at 100° C. Godet stretch was 50–60%. (As used in this and the following examples, godet stretch is the difference between the circumferential speed of the initial and final godet, divided by the speed of the initial godet, times 100.)

EXAMPLES 2–24

A series of additional fibers were prepared using temperatures and times set forth in Table I below. $S_{6.5}$ solubility tests for alkaline resistance were then conducted on fibers prepared by each of the Examples.

The $S_{6.5}$ solubility tests were conducted by adding a fiber sample to a 6.5% NaOH solution at 20° C. The mixture was vigorously shaken to disperse the sample in the caustic and allowed to steep for a total time of one hour from addition. The solution was then filtered with a slight vacuum and a 5 ml aliquot of the filtrate was oxidized by the addition of 10 ml of 0.5N potassium dichromate and 25 ml of concentrated $H_2SO_4$. After stirring the filtrate was permitted to stand for five minutes and 75 ml of distilled water and 2 to 3 drops of ferroin indicator (0.025 M ortho-phenanthroline ferrous sulfate) were added. The oxidized filtrate was then titrated to the endpoint with ferrous ammonium sulfate (FAS). The $S_{6.5}$ is calculated by the following formula:

$$\frac{\% \text{ Solubility}}{\text{in 6.5\% NaOH}} = \frac{34.23 \, (B - T)}{(S) \, (\text{Sample Wt.})}$$

in which B is the volume in mls of FAS required to titrate a blank sample of 0.5N dichromate, T is the volume in mls of FAS required to titrate the test sample and S is the volume in mls of FAS required for standardization against dichromate. Sample weight is oven dried.

The results of the $S_{6.5}$ solubility tests for each of the foregoing examples are set forth in Table I. From 5 to 6 fiber samples were tested for each example and the ranges set forth cover the 5 or 6 results of each example.

TABLE I

| Example | $N_2O_4$ Addition Temp., °C | Dissolution (+ Storage) Time, hrs. | Dissolution and Storage Temp., °C | % $S_{6.5}$ |
|---|---|---|---|---|
| 1 | −3 to +2 | 16 | −5 | 26–31 |
| 2 | −3 to +6.5 | 16 | −5 | 33–38 |
| 3 | −3 to −5 | 16 | 30 | 86–87 |
| 4 | −3 to −5 | 19 | 22 | 90–97 |
| 5 | −3 to +2 | 20 | −5 | 41–45 |

TABLE I-continued

| Example | $N_2O_4$ Addition Temp., °C | Dissolution (+ Storage) Time, hrs. | Dissolution and Storage Temp., °C | % $S_{6.5}$ |
|---|---|---|---|---|
| 6 | −3 to −4 | 16(+52) | −8 | 21–28 |
| 7 | −5 to −1 | 18 | −8 | 38–41 |
| 8 | −5 to −7 | 16(+51) | −8 | 20–26 |
| 9 | −6 to −5 | 18 | −5 | 18–26 |
| 10 | −5 to −4 | 18 | −6 | 24–39 |
| 11 | −5 to −1 | 18 | −8 | 18–36 |
| 12 | −3 to −1 | 18 | −6 | 26–28 |
| 13 | −5 to −2 | 16 | −2 | 33–37 |
| 14 | −7 to −2 | 16 | 0 | 37–40 |
| 15 | −6 to −4 | 16 | −7 | 34–36 |
| 16 | −1 to −0.5 | 17 | +1 | 32 |
| 17 | −5 to −3 | 22.5 | −6 | 38–45 |
| 18 | −7 to −5 | 16 | −4 | 33–35 |
| 19 | −5 to 0 | 16 | −2 | 32–33 |
| 20 | −4 to −1 | 19 | −3 | 42–45 |
| 21 | −2 to +2 | 17 | −7 | 36–37 |
| 22 | −6 to −1 | 16(+50) | −2 | 37"41 |
| 23 | −4 to −1 | 20 | −4 | 33–34 |
| 24 | −5 to +2 | 21 | −3 | 40–42 |

The dissolution temperatures shown are the maximum temperatures to which the solutions were permitted to rise during dissolution and any subsequent storage time.

EXAMPLES 25–44

A series of additional fibers were prepared again varying temperatures and times. In these examples, the dissolution, or dissolution and storage temperatures were permitted to rise above 20° C. In addition, in Examples 37 and 39, $N_2O_4$ addition was carried out at temperatures over 20° C. Results are set forth in Table II.

TABLE II

| Example | $N_2O_4$ Addition Temp., °C | Dissolution (+ Storage) Time, hrs. | Dissolution and Storage Temp., °C | % $S_{6.5}$ |
|---|---|---|---|---|
| 25 | +3 to +8 | 16 | 26 | 52–56 |
| 26 | −1 to +3 | 16 | 26 | 46–49 |
| 27 | +2 to +5 | 16 | 27 | 50–51 |
| 28 | +3 to +5 | 16 | 30 | 44–45 |
| 29 | +2 to +5 | 16 | 23 | 36–37 |
| 30 | +3 to +8 | 16 | 26 | 42–43 |
| 31 | +1 to +7 | 16 | 21 | 39–46 |
| 32 | +5 to +19 | 16 | 31 | 47–60 |
| 33 | +1 to +8 | 16 | 26 | 42–51 |
| 34 | +2 to +6 | 16 | 26 | 53–57 |
| 35 | +2 to +7 | 16 | 27 | 89–90 |
| 36 | +2 to +7 | 16 | 27 | 48–52 |
| 37 | +22 to +41 | 16 | 31 | 78–80 |
| 38 | +5 to +8 | 16 | 33 | 67–76 |
| 39 | +20 to +25 | 16(+75) | 22 | 87–92 |
| 40 | +2 to +4 | 16 | 27 | 37–47 |
| 41 | +2 to +11 | 16 | 26 | 47–55 |
| 42 | +2 to +3 | 16 | 25 | 41–43 |
| 43 | +2 to +3 | 16 | 26 | 37–50 |
| 44 | +3 to +4 | 16 | 26 | 55–57 |

EXAMPLES 45–48

In these examples, two sets of duplicate spin runs were conducted on the same solutions. Half were spun immediately after dissolution, and half were allowed to stand at ambient temperature for 24 hours. The results were as follows:

TABLE III

| Example | $N_2O_4$ Addition Temp., °C | Dissolution (+ Storage) Time, hr. | % $S_{6.5}$ |
|---|---|---|---|
| 45 | +10 to +14 | 3.5 | 29–31 |
| 46 | +10 to +14 | 3.5 (+24) | 45–55 |
| 47 | −3 to 0 | 3.0 | 28–30 |
| 48 | −3 to 0 | 3.0 (+24) | 56–59 |

It should be noted that $S_{6.5}$ solubility is not 100% correlated with the amount or extent of $NO_2$ oxidation occurring during dissolution. Spinning conditions, i.e., jet stretch, godet stretch, spinning speed, coagulants and specific process conditions effect $S_{6.5}$ since they all relate to the crystallite size and the degree of interbonding between crystals. Orientation, DP, the degree of molecular bonding and chain length also influence caustic solubility. Thus, samples prepared under similar conditions in Tables I and II have different $S_{6.5}$ solubility ranges. However, these differences were relatively small compared with the differences in solubility levels resulting from the effect of time and temperature parameters. The data overall clearly demonstrate a strong correlation between temperature and time on the one hand and $S_{6.5}$ solubility on the other hand.

We claim:

1. A process for producing a regenerated cellulosic fiber of improved alkaline resistance comprising
   nitrosating cellulose with a nitrosating agent selected from the group consisting of an oxide of nitrogen and nitrosyl chloride and dissolving from 5 to 14% by weight of the cellulose in a dialkylacylamide solvent to form a solution of cellulose nitrite ester while said solution is maintained at a temperature no greater than 20° C. and
   regenerating said cellulose by contacting the cellulose ester solution with a regenerant therefor containing a protonic group, the time at temperature of said cellulose ester solution from completion of dissolution to regeneration ranging from a maximum of 2 hours at a temperature not exceeding 20° C. to a maximum of 60 hours at a temperature below 0° C., said regeneration occurring before significant oxidation of said cellulose takes place.

2. The process of claim 1 in which the cellulose nitrite ester solution is regenerated in a maximum of 2 hours after completion of dissolution and the temperature of the solution prior to regeneration does not exceed 20° C.

3. The process of claim 1 in which the cellulose nitrite ester solution is regenerated within 60 hours after dissolution and the temperature of the solution from completion of dissolution to regeneration does not exceed 0° C.

4. The process of claim 1 in which the solution is maintained at a temperature no greater than 10° C during nitrosation and dissolution.

5. The process of claim 1, in which the solvent is dimethylformamide.

6. The process of claim 1 in which the nitrosating agent is $N_2O_4$.

* * * * *